Feb. 13, 1945.　　　O. KYLIN ET AL　　　2,369,466
AUTOMATIC CHUCK AND STOCK FEED FOR MACHINE TOOLS
Filed May 12, 1942　　　6 Sheets-Sheet 1
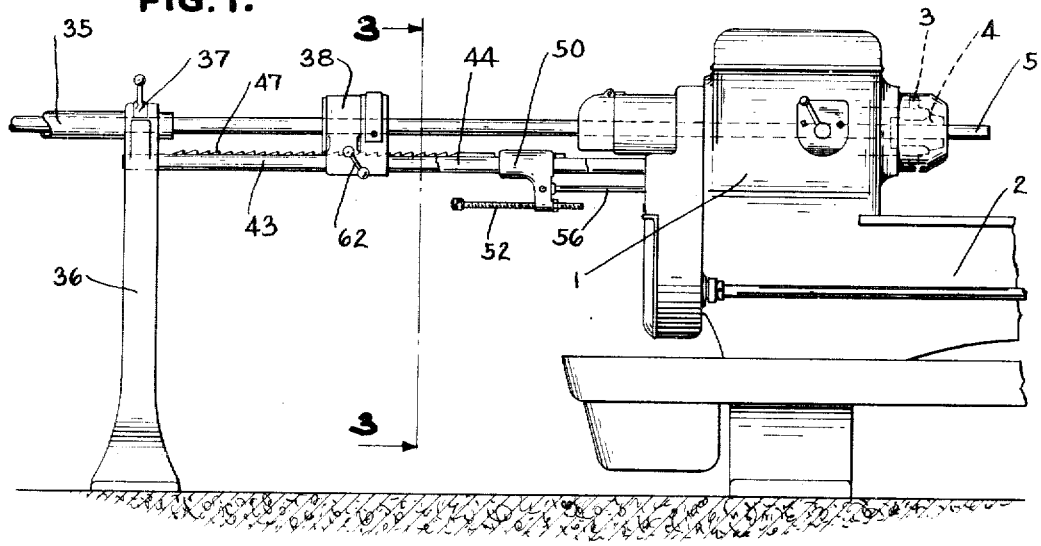
FIG. 1.
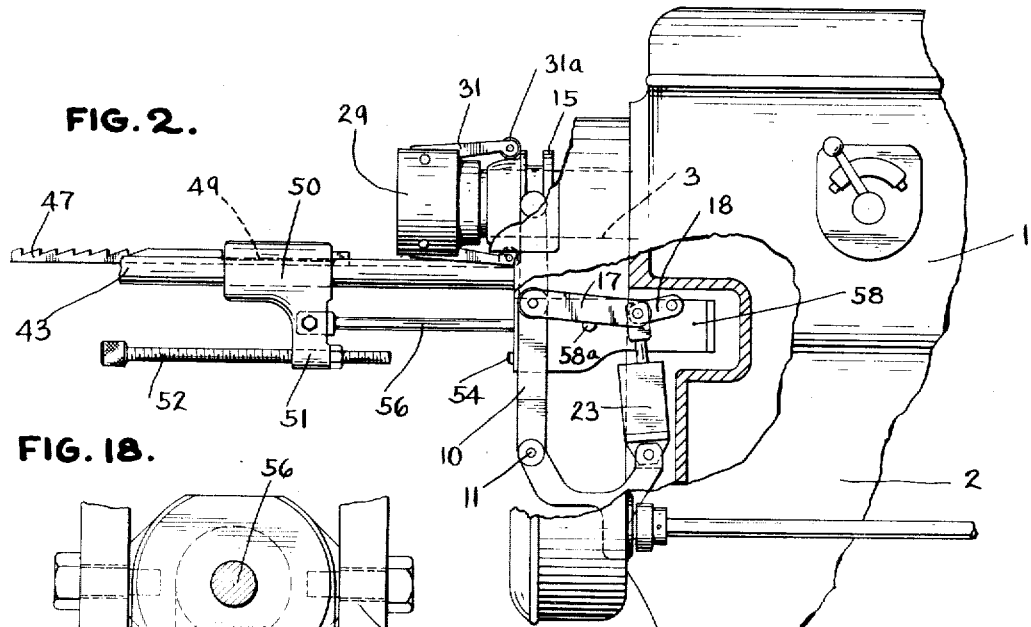
FIG. 2.
FIG. 18.
OSKAR KYLIN
HENRIK O. KYLIN　　INVENTORS
MICHAEL L. VALENTINO
BY Haygood & Van Horn
Their ATTORNEYS

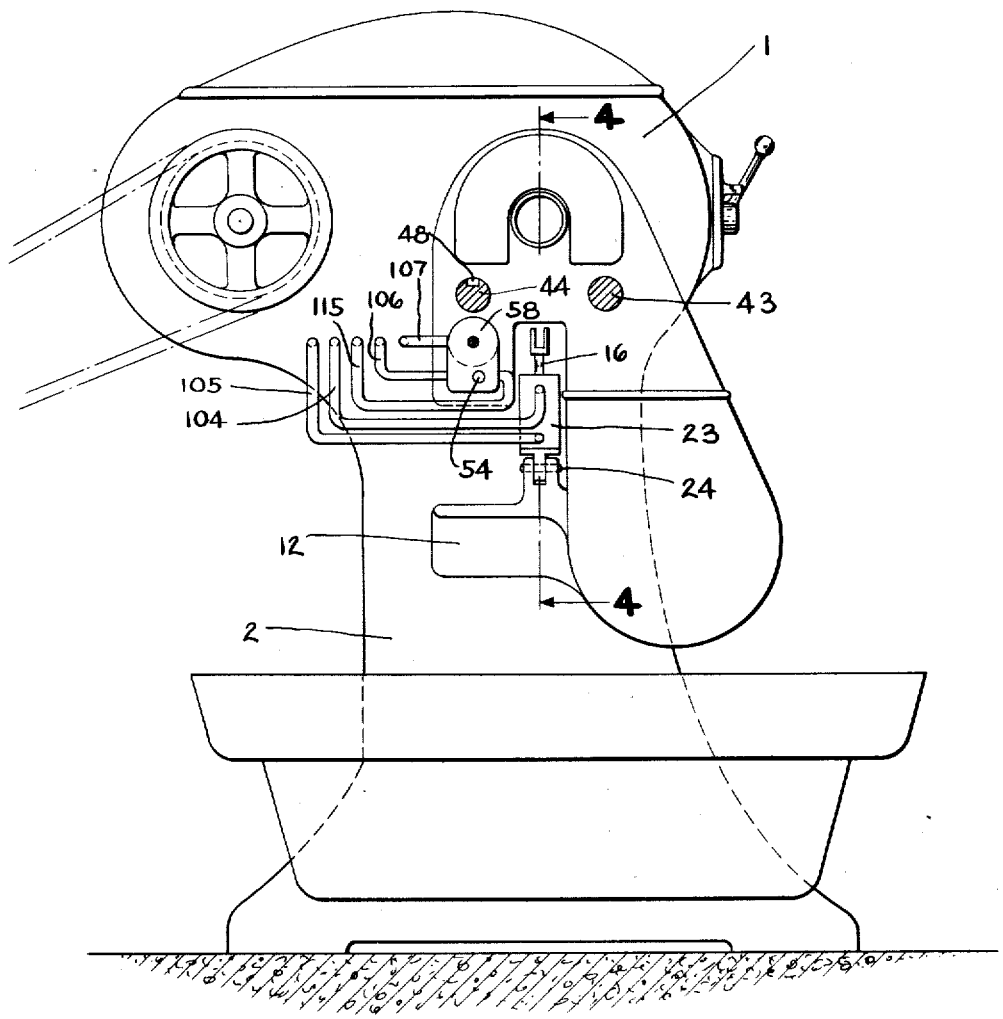

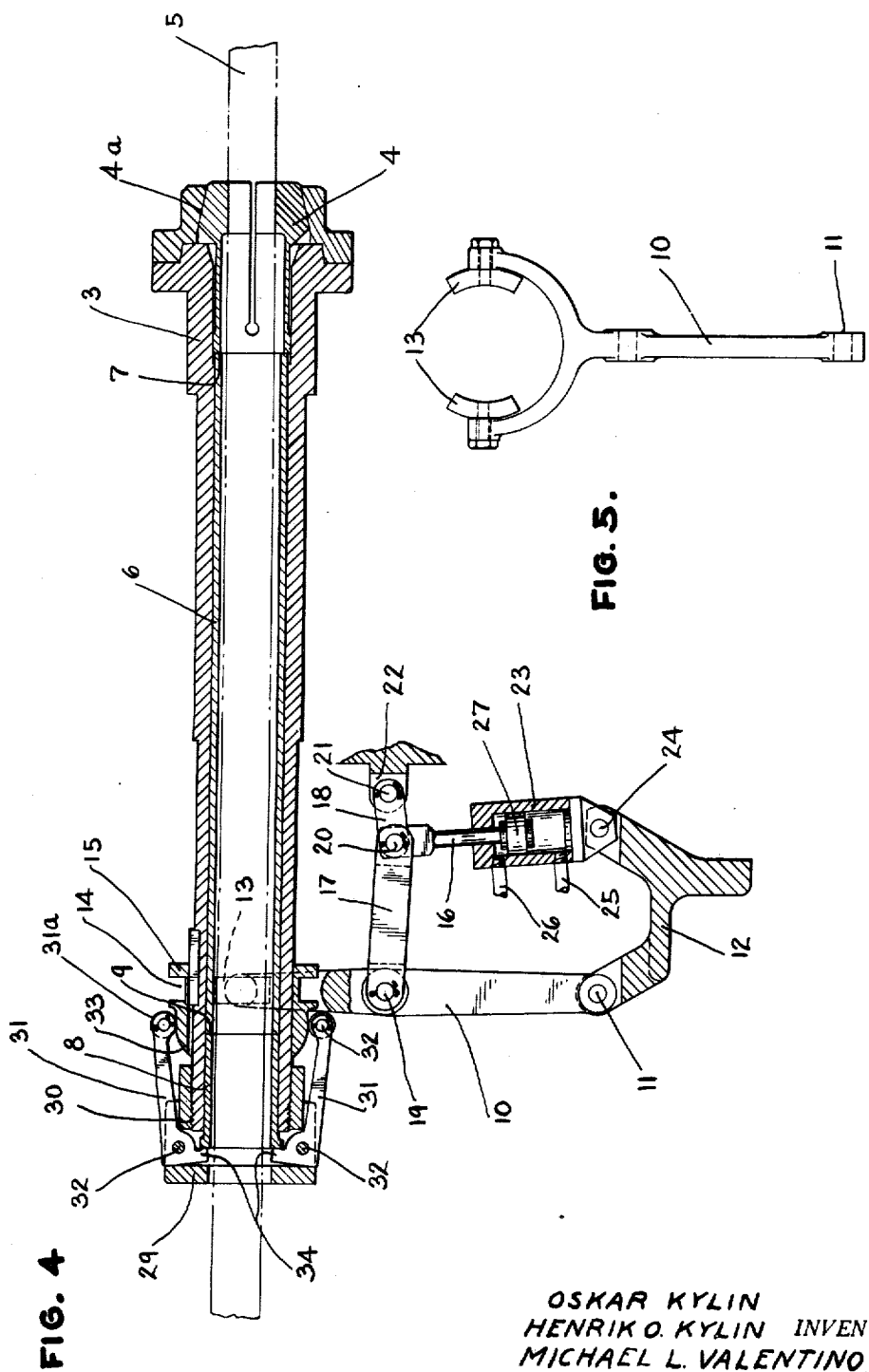

Feb. 13, 1945.     O. KYLIN ET AL     2,369,466
AUTOMATIC CHUCK AND STOCK FEED FOR MACHINE TOOLS
Filed May 12, 1942     6 Sheets-Sheet 4
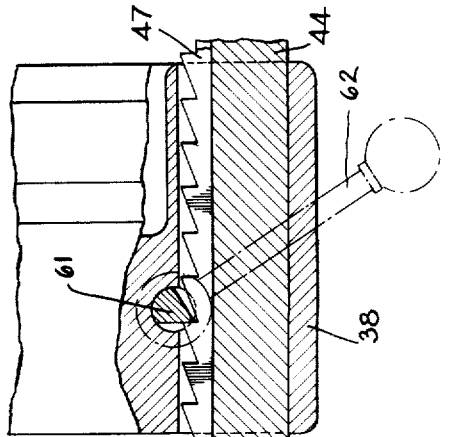
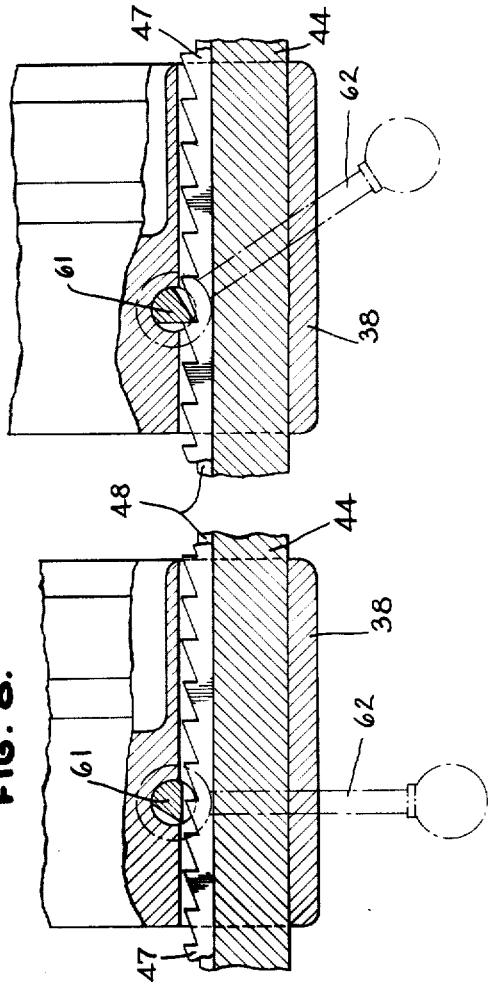
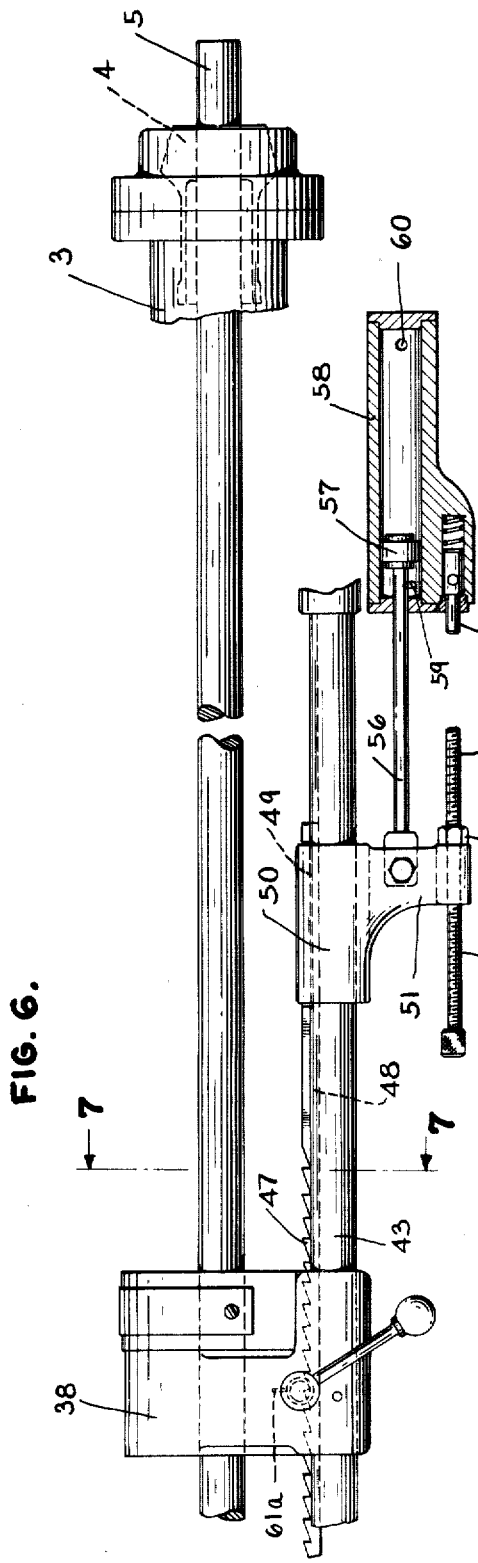
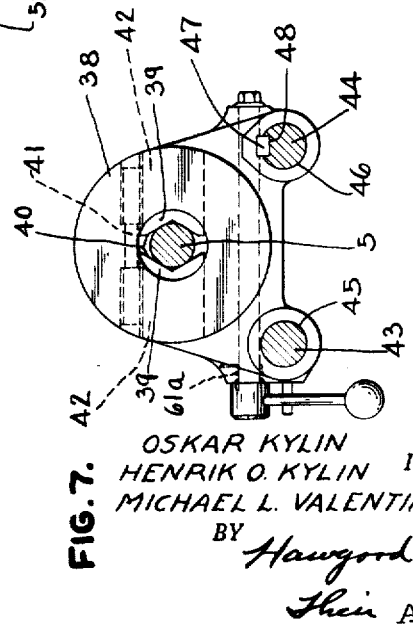
OSKAR KYLIN
HENRIK O. KYLIN   INVENTORS
MICHAEL L. VALENTINO
BY Haugood & VanHorn
Their ATTORNEYS Feb. 13, 1945. O. KYLIN ET AL 2,369,466
AUTOMATIC CHUCK AND STOCK FEED FOR MACHINE TOOLS
Filed May 12, 1942 6 Sheets-Sheet 5
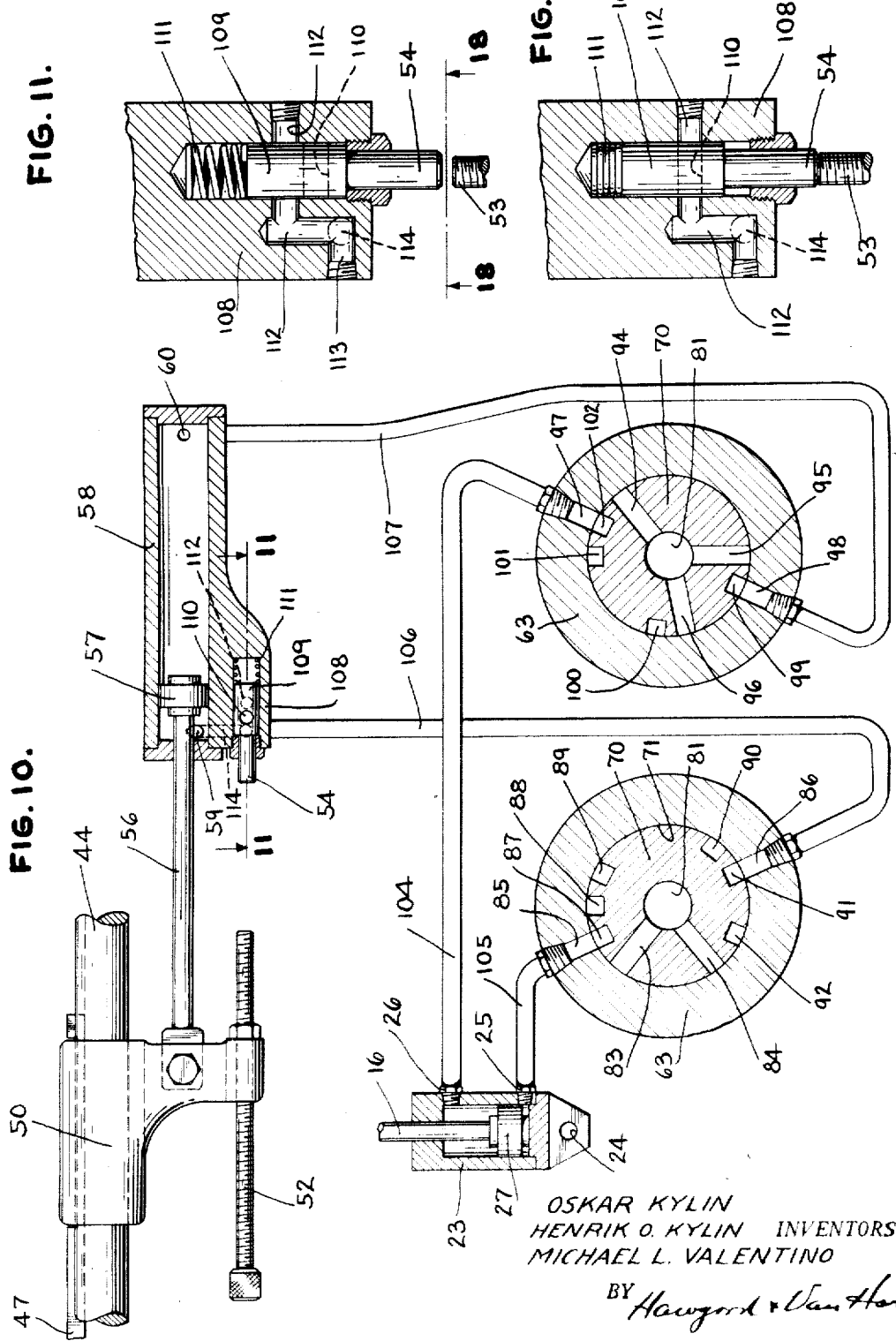

Feb. 13, 1945. O. KYLIN ET AL 2,369,466
AUTOMATIC CHUCK AND STOCK FEED FOR MACHINE TOOLS
Filed May 12, 1942 6 Sheets-Sheet 6
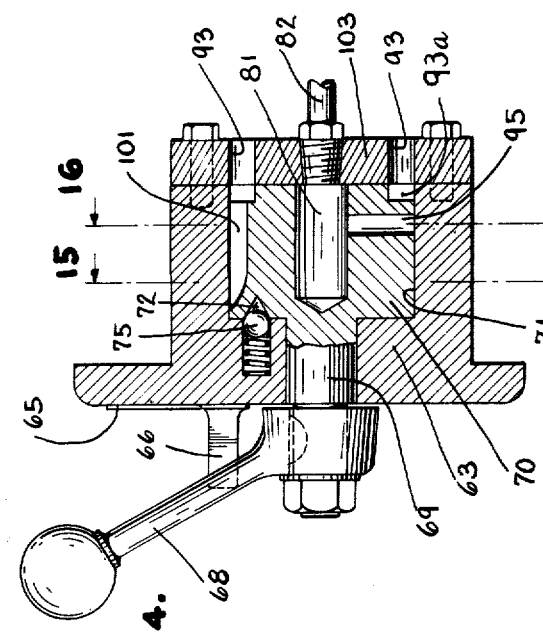
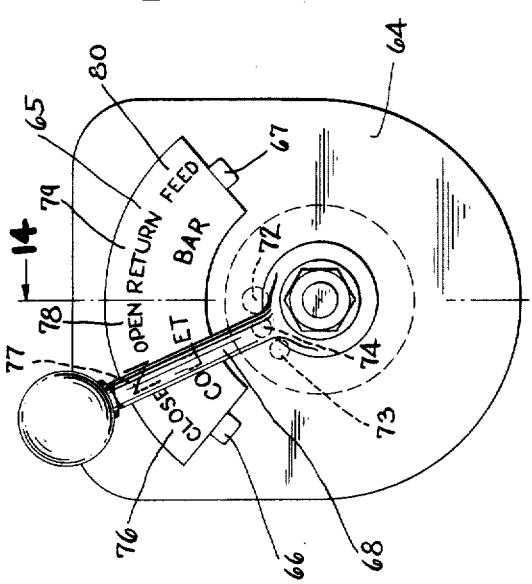
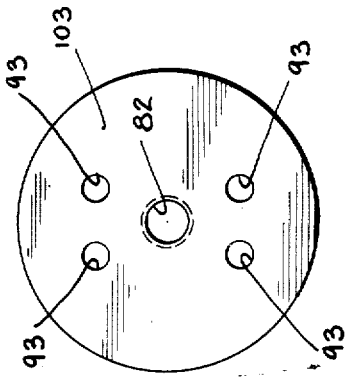
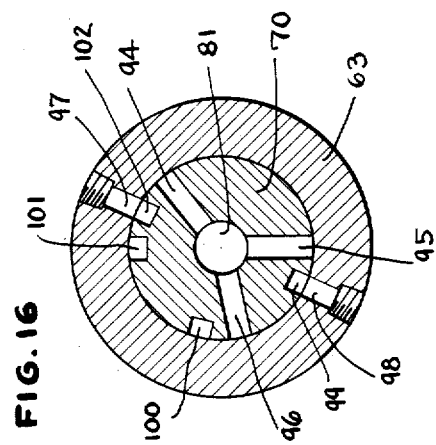
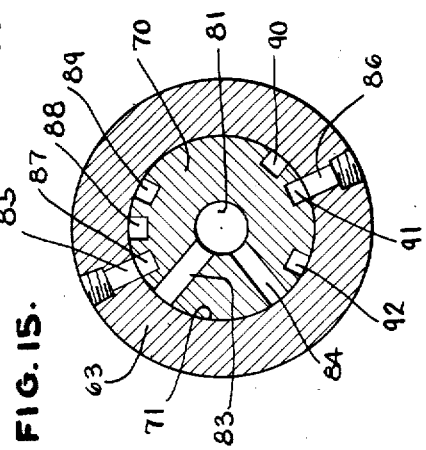
OSKAR KYLIN
HENRIK O. KYLIN INVENTORS
MICHAEL L. VALENTINO
BY
*their* ATTORNEYS Patented Feb. 13, 1945

2,369,466

UNITED STATES PATENT OFFICE 2,369,466

AUTOMATIC CHUCK AND STOCK FEED FOR MACHINE TOOLS

Oskar Kylin, Henrik O. Kylin, and Michael L. Valentino, Cleveland Heights, Ohio, assignors to Bardons and Oliver, Inc., Cleveland, Ohio, a corporation of Ohio Application May 12, 1942, Serial No. 442,626

3 Claims. (Cl. 29—59)

Our invention relates to machine tools and more particularly to automatic power actuated chuck and stock feed means and a single centralized control means therefor.

It is one of the objects of the present invention to provide an improved means for feeding bar or tube stock into or through a machine tool.

Another object of the invention consists in the provision of means for controlling the stock feeding means.

Another object is to provide a centralized feed control for the stock feeding mechanism which is so constructed and positioned on the machine tool that it may be utilized without fatigue to the machine tool operator or distraction from the operation the machine is performing on the work.

A further object of the invention is the provision of means for automatically gripping the bar or tube stock in a machine tool after a predetermined length thereof has been advanced for a machine tool operation.

Another object is the provision of a simple, centralized single control member for actuating the stock gripping means.

A still further object is to provide in a machine tool a centralized control means for controlling the feeding and gripping of the stock passing into or through a machine tool, in which the combined control may be actuated by a single operating member having a selection of positions.

Another object consists in providing an automatic stop for the feeding mechanism when a predetermined length of tube or bar stock has been fed into or through a machine tool.

Another object of the invention resides in the provision of automatic means for feeding and gripping bar or tube stock passing into or through a machine tool together with a centralized single selective control whereby the stock may be fed into the machine tool for a machine tool operation, gripped during said operation and subsequently released for a subsequent feeding of the stock for a successive operation on the stock.

A further object of the invention is a machine tool having bar or tube stock feeding and gripping means which is power operated and which is selectively controlled through the operation of a single control member.

Another object of the invention is to provide a stock feeding means for a machine tool which can be adjusted to feed the stock in a succession of predetermined lengths into or through the machine tool.

Another object of the invention is the provision in a machine tool of automatic power operated means for alternately feeding and gripping bar or tube stock into or through a machine tool.

Other objects and advantages of our invention will become more apparent as the following description of an embodiment thereof progresses, reference being made to the accompanying drawings in which like reference characters are employed to designate like parts throughout the same.

In the drawings:

Figure 1 is a front elevation of a machine tool, illustrating one embodiment of power operated stock feeding and gripping mechanism as applied to the head stock of a machine such as a lathe;

Figure 2 is an enlarged elevation similar to that shown in Figure 1 in which the casing is broken away to illustrate one form of power driven means for operating the stock feeding and gripping mechanisms;

Figure 3 is an enlarged end view of the machine tool taken on line 3—3 of Figure 1;

Figure 4 is a section taken on line 4—4 of Figure 3 through the power operated stock gripping mechanism;

Figure 5 is a detail view of a power operated yoke or similar member shown in Figure 4 for actuating the gripping means;

Figure 6 is a side elevation of power operated means for advancing or feeding the tube or bar stock in the machine tool a predetermined distance for a machine operation upon the stock;

Figure 7 is an end view of the stock feeding head taken in the direction of line 7—7 of Figure 6;

Figure 8 is an enlarged fragment view of the feeding ratchet shown disengaged from the rack bar;

Figure 9 is a view similar to that shown in Figure 8, but illustrates the ratchet engaged with the rack bar for feeding the stock;

Figure 10 illustrates diagrammatically a hydraulic system for controlling the feed of tube or bar stock into or through a machine tool;

Figure 11 is an enlarged section taken on line 11—11 of Figure 10;

Figure 12 is a view similar to that shown in Figure 11 and shows the manner in which the stock feed shut off valve is operated;

Figure 13 is a front elevation of a single centralized control for both the stock gripping means and the stock feeding means;

Figure 14 is a vertical section through the control shown in Figure 13;

Figure 15 is a section taken on line 15—15 of Figure 14;

Fig. 16 is a section taken on line 16—16 of Figure 14;

Fig. 17 is a rear elevation of the control unit; and

Figure 18 is a front elevation of the stock feed bypass valve taken in the direction of line 18—18 of Figure 11.

The present invention is intended for use with machine tools and while we have illustrated in the accompanying drawings an application of the invention to lathes, it is to be understood that we do not hereby limit such application, but fully recognize that the same may be effectively employed in connection with other types of machine tools for automatically feeding and gripping bar or tube stock passing into or through the machine.

In the embodiment shown in the attached drawings 1 indicates the head stock of a lathe 2, there being provided a spindle 3 and a collet or chuck 4 for gripping the stock 5.

By the present invention we have provided a controlled means for gripping the bar or tube stock in the spindle while a machine operation is being performed on a predetermined projecting portion of the stock, and for releasing the gripping means whereby the stock may be fed forwardly for successive machine operations on successive portions of the stocks. We have also provided controlled means for successively feeding the bar or tube stock in predetermined lengths into or through the spindle and gripping means when the gripping means is released. In addition the present invention also contemplates a central single control means for interchangeably actuating the gripping and the feeding means.

Referring now more particularly to the embodiment illustrated, we will first describe the stock gripping means and its operation. This part of our invention is disclosed in the embodiment illustrated in Figures 2, 4 and 5. The machine spindle 3 may be driven at selected speeds by the usual power transmission and speed selector mechanism (not shown).

A pusher tube 6 is slidably movable in the hollow spindle and engages at its forward end with the inner end of the collet as at 7. A sleeve 8 abuts the opposite end of the tube as at 9 and is operable to slide the tube and collet forwardly to effect a closing of the collet jaws about the bar or tube stock to grip the same during a machine operation on the exposed end of the stock. As the collet moves to the right in Figure 4 its slotted head will grip the stock due to the interfitting tapered surface of the head and the hood as at 4a.

In accordance with the embodiment illustrated, we have shown hydraulically operated means for sliding the sleeve and tube to grip the stock in the spindle and for releasing such grip to permit the stock to be fed forwardly of the spindle. However, the mechanism for gripping and releasing the stock may be operated equally as well by electrical, magnetic or mechanical means, and it is to be understood that while only hydraulic operation is shown herein, we do not limit the invention in this respect.

A yoke 10 is pivotally mounted at 11 upon a support 12 carried on the bed 2, and is provided with yoke shoes 13 which are positioned in the annular groove 14 of the wedge collar 15 for sliding the wedge axially on the spindle in closing or releasing the collet grip on the stock.

The yoke 10 is movable on the pivot 11 by a toggle connection with the piston rod 16 as shown by the links 17 and 18, the link 17 being pivotally connected with the yoke at 19 and with the piston rod and the link 18 at 20. The opposite end of the link 18 is pivotally connected at 21 with a fixed support 22 carried on the bed. A hydraulic cylinder 23 is rockably carried on the support 12 at 24 and is provided at 25 and 26 with ports for selectively supplying and exhausting fluid under pressure on opposite sides of the piston head 27. The ports 25 and 26 have hydraulic connection with a suitable control means and with a source of fluid under pressure, as will be disclosed hereinafter.

In order to transmit motion from the sliding wedge 15 to effect a forward axial movement of the sleeve 8 and the pusher tube 6 to cause the collet head to grip a piece of stock 5, we have provided an end member 29 which is secured to the spindle at 30 to rotate therewith. The end member carries a plurality of fingers 31 pivoted at 32, each having a terminal roller 31a adapted to roll upon the rounded portion 33 of the wedge as the wedge is moved to the right or left in Figure 4. Each finger is provided with a depending projection or heel 34 which moves in the path of the rear end wall of the sleeve 8 and serves to push or slide the sleeve and the pusher tube 6 to the right to close the collet jaws against the stock 5 when the parts are in the position shown in Figure 4, or to release the grip on the stock when the piston 27 is in the lowermost position in its cylinder. As will be seen from the drawings, the wedge rotates with the spindle, but it is always subject to sliding movement on the spindle by virtue of the pivoted yoke 10 and the shoes 13 which ride in the guiding groove 14 of the wedge.

From the above, it will be understood that when fluid under pressure is delivered through the port 25 and the port 26 is open to exhaust the yoke 10 will swing to the position shown in Figure 4. In this position, the roller 31a will ride up the rounded portion 33 of the wedge collar and will spread the fingers 31 outwardly, causing the heel portions 34 to engage and push the sleeve and tube 6 to the right to grip the stock, while by suitable selector control means to be described hereinafter, when the port 25 is open to exhaust and the port 26 delivers fluid under pressure to the opposite side of the piston 27, the yoke and wedge collar will move to the right and the collet jaws will be permitted to release their grip on the stock.

Our invention also includes a cooperating mechanism for automatically feeding bar or tube stock through the spindle when the collet is released. One embodiment of this novel feeding mechanism is illustrated in detail in Figures 1, 2, 6, 7, 8, 9 and 10 to which reference is made for the following description of this portion of our invention.

A length of bar or tube stock 5 is fed through a tube 35 removably secured in a supporting stand 36 by means of the clamp 37. The stock then passes through a feeding head 38 and finally through the spindle and collet as illustrated in Figure 1. The stock feeding head is provided with a plurality of bearing members 39 having oppositely inclined inner walls 40 for supporting the bar or tube stock 5 in the head. The bearing members are freely rotatable with the stock in the head and serve to grip and support the stock in proper alignment with the spindle.

The bearing members 39 may be tightened and released on the bar by operating a reversely threaded screw 41 to slide the follower portions 42 toward or away from each other.

A pair of guide rods 43 and 44 are secured at one end in the standard 36 and are supported at their opposite ends in the head stock 1. These rods preferably lie in parallel relation and pass through suitable bearings 45 and 46 in the feed head, the rod 44 having a rack bar 47 slidably fitted in the slot 48 formed in the rod. The rack bar extends toward the head stock and at its forward end is provided with a recess 49 to seat the upper portion of the pusher body 50 slidable with the rack bar 47 on the rods 43 and 44 as shown in Figure 6.

A depending portion 51 of the pusher carries an adjustable stop 52 threaded thereinto and projecting forwardly of the pusher at 53 in alignment with a valve stop 54. A lock nut 55 serves to lock the stop 52 in its adjusted position in the pusher.

A connecting rod 56 connects the pusher with a piston 57 operating in the hydraulic cylinder 58 pivotally mounted in the head stock as at 58a Figure 18 Suitable ports 59 and 60 communicate with the interior of the cylinder on opposite sides of the piston 57 and are connected with a suitable control means and with a source of fluid under pressure. As shown in Figure 6 when fluid under pressure is delivered through the port 60 and port 59 is open to exhaust, the piston 57 will be moved to the left to slide the pusher 50 and the rack bar 47 in the same direction along the rods 43 and 44 to the position shown. In this manner the rack bar 47 will slide through the head 38 along the rod 44 and will come to rest in position to be engaged by a spring urged latch 61 in the stock feeding head.

A coiled spring 61a normally shifts the latch handle 62 and latch 61 to the position shown in Figure 9 for engagement with the vertical face of the teeth of the rack bar, but the latch is rocked out of locking position with the teeth when the rack bar is moved to the left. Movement of the pusher to the right will feed the bar or tube stock 5 into or through the spindle in preparation for a working operation on the stock, since the spring 61a normally rotates the latch to locking position as has been pointed out. Movement of the pusher 50 to the right in Figure 6 and feeding of the stock is accomplished when fluid under pressure is supplied through the port 59 in the cylinder and port 60 is exhausting.

The present invention also contemplates a conveniently located single control means by which the collet may be operated to grip or release the bar or tube stock in the spindle and by which the stock may be fed into or through the spindle in successive predetermined lengths whereby to project a new length of stock from the spindle for a tool operation upon the completion of one or more tool operations upon a preceding length of stock. In the embodiment illustrated, we have shown the control means as a selector valve in a hydraulic system, but it is to be understood that similar control means may be employed in electrical, magnetic or mechanical systems for selecting the operation of the gripping means and the feeding means. In such instances, the central control means may constitute a multiple-circuit switch, a magnetic selector unit, or a suitable mechanical selector respectively.

In Figures 10 to 17 inclusive, we have illustrated the control means as comprising a manually operated selector or control valve 63 which is preferably located on the head stock or at some other place on the machine within convenient reach of the operator. The valve casing is provided with a face plate 64 having suitable indicia thereon at 65 and a pair of stops 66 and 67 to limit the movement of the valve handle 68. The handle is removably secured to the valve stem 69 carried by the valve body 70 which is rotatable in the casing bore 71. The valve body is provided with a plurality of detents 72, 73 and 74 into which projects a spring pressed ball 75 mounted in the casing when the valve is in one of several selected positions. If desired the detent 72 may be slightly longer than the others and to thereby seat the ball 75 deeper to emphasize to the operator that this is the neutral position of the handle.

In Figures 15 and 16, which are sectional views through the valve and casing, and Figure 17 which is an inner view of the valve body, we have shown the various ports and conduit connections by which fluid under pressure may be distributed to operate the collet and the stock feeding means in response to the selected position of the valve in the casing.

The control handle and the valve body which it operates have five positions in the embodiment shown as indicated at 76, 77, 78, 79 and 80 by the indicia "Closed," "N" (neutral), "Open," "Return," and "Feed" respectively. It will be noted that the first and third positions correspond to the operation of the collet while the fourth and fifth relate to the operation of the stock feeding means. When the valve handle is at 77 it indicates a neutral position and both cylinders 23 and 58 will be open to exhaust at each port thereof, as illustrated in Figure 10.

As viewed through the sections taken on lines 15—15 and 16—16 of Figure 14, the valve body is provided with an axial bore 81 which communicates with a conduit 82 supplying fluid under pressure from a suitable source (not shown). In the section represented in Figure 15, the valve body is provided with radial ducts 83 and 84 for conveying fluid under pressure from the bore 81 to one of a plurality of ports, 85 and 86, arranged in the valve casing 63, depending upon the rotative position of the valve body. A plurality of longitudinally arranged exhaust ducts or grooves 87, 88, 89, 90, 91 and 92 are formed in the outer wall of the valve body and extend rearwardly to its outer end, and are adapted to selectively register with the ports 85 and/or 86 in the valve casing as the valve body is rotated to exhaust the fluid into an annular groove 93a and through the valve outlets 93 and into the transmission casing.

It will be seen that the ports 85 and 86 may function as fluid inlet or exhaust ports depending upon the position of the valve body 70. In Figure 15 these ports are in exhaust position.

Likewise, the valve body 70, when viewed along the section taken on line 16—16 as in Figure 16, is provided with radially arranged ducts 94, 95 and 96 communicating with the central supply bore 81 and adapted to be positioned to deliver fluid under pressure to either of the ports 97 or 98 in the valve casing, depending upon the rotative position of the valve. In the position shown the ports 97 and 98 will function as exhaust ports.

Longitudinally arranged grooves or ducts are also formed in the valve body as at 99, 100, 101 and 102, and at their outer ends have communication with the extreme ports 93, formed in the valve sealing end plate 103.

Referring particularly to Figure 10, it will be seen that the ports 26 and 25 of the cylinder 23 controlling the stock gripping means are hydraulically connected respectively with the valve casing 63 by means of the conduits 104 and 105 to the ports 97 and 85, while ports 59 and 60 of the cylinder 58 controlling the stock feeding means are hydraulically connected with the valve casing 63 by means of the conduits 106 and 107 to the ports 86 and 98, respectively.

A stop operated by-pass valve 108 is provided adjacent the cylinder 58 and comprises a valve body 109, having a transverse opening 110 and a stop member 54 projecting axially in the path of the adjustable stop 52 as illustrated in Figure 10. A compression spring 111 normally projects the stop member 54 to its limit of outward travel and, as seen in Figure 11, the opening 110 is thus normally out of alignment with the transverse duct 112 in the casing 108. When in this position fluid entering the duct 112 at 113 will be forced into the cylinder 58 at port 59 through a pipe or conduit 114 to move the piston 57 to the right in Figure 10. As the piston closely approaches the selected limit of motion in this direction, the stop 52 will engage the stop member 54 and further movement will slide the valve 109 to the right to bring the opening 110 into register with the transverse duct 112 as shown in Figure 12. When the parts are in this position, fluid under pressure entering at 113 will be by-passed through the opening 110 and conduit 115 to exhaust, thus stopping any further movement of the piston 57 to the right and stopping the feed of the stock.

In order to better understand the control of the stock gripping means, the feeding means, and the operation of the automatic feed stop, we will now proceed to describe the operation of the entire mechanism throughout the several selected positions of the control valve.

The control handle has five positions in the embodiment illustrated, and may be operated to any position in either direction, although the preferred cycle of operation is from "N" or neutral, to the right in Figure 13 first to collet open position 78, then to "return" 79 for the feeding head, then to bar "feed" 80 position and finally to the extreme left to "closed" collet position 76. The stock is thus gripped in the collet and its projecting end is ready for a tool operation.

With the control valve in "N" or neutral position, as shown in Figures 10, and 13 to 16 inclusive, both cylinders 23 and 58 are open to exhaust as explained above.

When the valve is rotated to position 78 to open the collet preparatory to feeding the stock through the spindle and assuming that the stock feeding head is in the "return" position as in Figures 1 and 10, fluid under pressure will be delivered through the axial bore 81, duct 94, conduit 104 to the port 26 of the collet cylinder 23. At the same time port 25 will be open to exhaust through conduit 105, port 85 and ducts 88 and 93, while ports 59 and 60 of the feed cylinder 58 will be closed through the control valve.

The next in the sequence of valve positions is indicated at 79 in Figure 13. This is the feed head return position in which fluid under pressure will be delivered through the bore 81 of the valve, duct 96, port 98, conduit 107 and port 60 of the feed cylinder 58 to force the piston 57 to the left as shown in Figure 10.

When the projecting end 53 of the stop 52 is out of operating engagement with the projection 54 of the by-pass valve, the port 59 will be open to exhaust through conduit 114, conduit 106, port 86 and ducts 92 and 93. If the feed head should be left in its extreme feed position or to the right in Figure 1 prior to a setting of the valve handle to position 78, it will be seen from the above that on reaching position 78 the head will be moved to the left hand position in Figures 1 and 10 preparatory to feeding the stock.

The next sequential valve position is the stock feeding position as indicated at 80 on the plate 65. In this position of the control valve 70, fluid under pressure is delivered through the axial bore 81, the duct 84, port 86 and conduit 106 to the by-pass valve at 113. Since the stops 52 and 54 are separated at the beginning of the stock feeding cycle as in Figure 10, the openings 110 and 112 will be out of alignment. Pressure fluid will be blocked to this extent, but will find outlet through the conduit 114 and the port 59 into the cylinder 58. Port 60 of this cylinder is open to exhaust through the conduit 107, port 98, ducts 100 and 93. In this manner the stock feeding head will be moved to the right in Figures 1 and 10 to feed the bar or tube stock into or through the open collet and spindle.

When the stop 52 engages and moves the stop member 54 against the compression of the spring 111 so that the opening 110 is in communication with the transverse duct 112 of the by-pass valve, fluid under pressure delivered through the port 113 will be by-passed from the cylinder 58 to exhaust through a conduit 115, thus automatically stopping the feeding stroke of the piston 57 as may be predetermined by the adjustment of the stop 52.

The final valve position as illustrated in the present embodiment is at 76 and is known as the collet "closed" position. When the valve handle is moved to the extreme left in Figure 13 against the stop 66, fluid under pressure will be delivered through the bore 81 of the valve, duct 83, port 85 and conduit 105 to the port 25 of the collet cylinder 23. At the same time port 26 will be open to exhaust through the conduit 104, port 97, ducts 101 and 93. The piston will rise in the cylinder under these conditions to the position shown in Figure 4 causing the wedge to slide to the left and spread the fingers 31 and draw in the heel 34 to impart a movement of the sleeve 8 and pusher tube 6 to the right to close the collet jaws against the advanced stock 5 in tight gripping relation.

This position of the control valve will also return the stock feeding head in the event the operator passes over position 79 too quickly when returning the handle from its extreme right hand position 80 against stop 67 to position 76. In position 76 this is accomplished by virtue of the fact that fluid under pressure is delivered through axial bore 81, duct 95, port 98 and conduit 107 to the port 60 of feed cylinder 58 while port 59 is open to exhaust first through duct 114 and conduit 112 via the by-pass valve and then directly through conduit 106, port 86, ducts 90 and 93.

We claim:

1. In a machine tool, a work spindle, a work gripping chuck in the spindle, hydraulically actuated means for closing and opening the chuck, hydraulically actuated means for feeding bar or tube stock through the chuck and spindle, a hydraulic system, a single control valve in said system operable through a plurality of positions, one of which includes feeding the stock when the chuck is open, and another of which includes closing said chuck to grip the stock, and a by-pass valve associated with said stock feeding means and operable by said feeding means to automatically stop said feeding means when a predetermined length of tube or bar stock has been fed through the spindle.

2. Fluid pressure operated stock feeding and chucking means for hollow spindle turret machines, comprising stock feeding means, chuck operating means, a supply of fluid under pressure, a fluid pressure cylinder, a piston in said cylinder and connected with said stock feeding means, and a by-pass valve communicating with said cylinder and operable by said stock feeding means to automatically stop said feeding means when a predetermined length of stock has been fed through the hollow spindle of the machine, a second fluid pressure cylinder, a piston therein having connection with said chucking means for operating the same, and a single control valve for selectively moving said respective pistons.

3. Fluid pressure operated stock feeding and chucking means for hollow spindle machine tools, comprising stock feeding means, chuck operating means, a supply of fluid pressure, a fluid pressure system, a pair of fluid pressure cylinders in said system, a piston in each of said cylinders, one of said pistons having connection with and operable to actuate said feeding means, the other piston having connection with and operable to open and close said chucking means, and a control valve in said system, said valve being movable through a plurality of positions to selectively actuate said pistons for opening the chucking means, feeding the stock and subsequently closing the chucking means to grip the feed stock preparatory to performing an operation on said stock, a stop carried by said feeding means, and cooperating means in the path of said stop and associated with the cylinder controlling the feeding means to render said cylinder ineffective when a predetermined length of stock has been fed through the spindle.

OSKAR KYLIN.
HENRIK O. KYLIN.
MICHAEL L. VALENTINO.

CERTIFICATE OF CORRECTION.

Patent No. 2,369,466. February 13, 1945.

OSKAR KYLIN, ET AL.

It is hereby certified that error appears in the printed specification of the above numbered patent requiring correction as follows: Page 4, first column, line 1, for the word "extreme" read --exhaust--; and that the said Letters Patent should be read with this correction therein that the same may conform to the record of the case in the Patent Office.

Signed and sealed this 15th day of May, A. D. 1945.

Leslie Frazer (Seal) Acting Commissioner of Patents.

of which includes feeding the stock when the chuck is open, and another of which includes closing said chuck to grip the stock, and a by-pass valve associated with said stock feeding means and operable by said feeding means to automatically stop said feeding means when a predetermined length of tube or bar stock has been fed through the spindle.

2. Fluid pressure operated stock feeding and chucking means for hollow spindle turret machines, comprising stock feeding means, chuck operating means, a supply of fluid under pressure, a fluid pressure cylinder, a piston in said cylinder and connected with said stock feeding means, and a by-pass valve communicating with said cylinder and operable by said stock feeding means to automatically stop said feeding means when a predetermined length of stock has been fed through the hollow spindle of the machine, a second fluid pressure cylinder, a piston therein having connection with said chucking means for operating the same, and a single control valve for selectively moving said respective pistons.

3. Fluid pressure operated stock feeding and chucking means for hollow spindle machine tools, comprising stock feeding means, chuck operating means, a supply of fluid pressure, a fluid pressure system, a pair of fluid pressure cylinders in said system, a piston in each of said cylinders, one of said pistons having connection with and operable to actuate said feeding means, the other piston having connection with and operable to open and close said chucking means, and a control valve in said system, said valve being movable through a plurality of positions to selectively actuate said pistons for opening the chucking means, feeding the stock and subsequently closing the chucking means to grip the feed stock preparatory to performing an operation on said stock, a stop carried by said feeding means, and cooperating means in the path of said stop and associated with the cylinder controlling the feeding means to render said cylinder ineffective when a predetermined length of stock has been fed through the spindle.

OSKAR KYLIN.
HENRIK O. KYLIN.
MICHAEL L. VALENTINO.

CERTIFICATE OF CORRECTION.

Patent No. 2,369,466.                  February 13, 1945.

OSKAR KYLIN, ET AL.

It is hereby certified that error appears in the printed specification of the above numbered patent requiring correction as follows: Page 4, first column, line 1, for the word "extreme" read --exhaust--; and that the said Letters Patent should be read with this correction therein that the same may conform to the record of the case in the Patent Office.

Signed and sealed this 15th day of May, A. D. 1945.

Leslie Frazer (Seal)                        Acting Commissioner of Patents.